United States Patent [19]

Kaneko

[11] Patent Number: 4,720,632
[45] Date of Patent: Jan. 19, 1988

[54] SYNCHRONIZING LIGHT BEAM DETECTOR

[75] Inventor: Yutaka Kaneko, Yokohama, Japan

[73] Assignee: Ricoh Co., Ltd., Tokyo, Japan

[21] Appl. No.: 821,169

[22] Filed: Jan. 21, 1986

[30] Foreign Application Priority Data

Jan. 25, 1985 [JP] Japan .................................. 60-12210
Jan. 30, 1985 [JP] Japan .................................. 60-16001
Jan. 31, 1985 [JP] Japan .................................. 60-15372

[51] Int. Cl.⁴ ............................................. H04N 1/10
[52] U.S. Cl. ..................................... 250/235; 358/293;
356/152; 250/236; 250/6.8
[58] Field of Search ................. 250/235, 236; 358/293;
356/152, 400; 350/252, 6.5, 6.7, 6.8

[56] References Cited

U.S. PATENT DOCUMENTS

| | | | |
|---|---|---|---|
| 3,347,134 | 10/1965 | Nerwin | 350/252 |
| 4,040,096 | 8/1977 | Starkweather | 350/6.8 |
| 4,084,197 | 4/1978 | Starkweather | 358/293 |
| 4,121,251 | 8/1978 | Arai | 358/293 |
| 4,616,132 | 8/1986 | Kessler | 250/236 |

*Primary Examiner*—Edward P. Westin
*Assistant Examiner*—Charles Wieland
*Attorney, Agent, or Firm*—Cooper, Dunham, Griffin & Moran

[57] ABSTRACT

A synchronizing light beam detecting apparatus is provided in a light scanning system, such as a laser printer, which includes a light source for emitting a light beam, a polygonal mirror driven to rotate for deflecting the light beam over a predetermined angle repetitively, and a f$\theta$ lens for focusing the deflected beam along a predetermined imaginary scanning line. The detector includes a cylindrical lens for receiving the light beam passing through the f$\theta$ lens and picked up at a predetermined position and a detector surface for receiving the light beam passing through the cylindrical lens. A conjugate relation is established between the light beam deflecting point at the polygonal mirror and the detector surface so that the effect of inclination of a mirror surface of the polygonal mirror is cancelled. The detector surface is so located that the light beam is formed thereon only by the image-forming action of the f$\theta$ lens so that the effect of differences in the beam deflecting point at the polygonal mirror from one mirror surface to another is advantageously cancelled.

16 Claims, 17 Drawing Figures

SYNCHRONIZING LIGHT BEAM DETECTOR

BACKGROUND OF THE INVENTION

1. Field of the Invention

This invention relates to an apparatus for detecting a light beam to be used in synchronization, and, in particular, to a synchronizing light beam detecting apparatus particularly suitable for use in a light scanning apparatus, such as a laser printer in which a light beam is scanned over an imaging surface.

2. Description of the Prior Art

A laser printer is well known in the art, and a light beam is repetitively scanned across the width of a photosensitive member which is moved in a direction perpendicular to the scanning direction of the light beam. The laser printer typically uses a polygonal mirror for deflecting a light beam having image information toward the photosensitive member. The polygonal mirror is provided with a plurality of mirror surfaces around its periphery, and as it is driven to rotate, the light beam deflected by one of the mirror surfaces is scanned across the photosensitive member. In this manner, the light beam carrying image information is repetitively deflected over a predetermined angle by each of the mirror surfaces one after another so that an electrostatic latent image is formed on the photosensitive member in accordance with the image information carried by the light beam.

In general, the light beam defected by the rotating polygonal mirror is then focused onto the photosensitive member in the form of a spot by an image forming lens, typically a fθ lens. As the polygonal mirror rotates to continuously change the positional relation with the incident light beam, the reflected light beam scans over a predetermined angle so that the light spot moves along a straight scanning line, whereby the light spot scans across the travelling photosensitive member. Such a scanning operation needs to be synchronized, and for this purpose, the light beam deflected by the polygonal mirror to be directed toward the photosensitive member is detected at a point beyond a predetermined scanning angle by a photodetector and used as a synchronizing light beam for synchronizing the initiation of each scanning operation.

The polygonal mirror has two major detrimental factors which could adversely affect the timing of scanning operation. The first factor relates to the so-called mirror surface inclination of the polygonal mirror, and this is the factor which arises from the fact that the mirror surfaces of the polygonal mirror are not truly in parallel with the rotating axis of the polygonal mirror but they are most likely to be inclined with respect thereto mainly due to manufacturing and assembling tolerances. The second factor relates to the scatter in the distance between each of the mirror surfaces of the polygonal mirror and its rotating axis, which also mainly stems from the manufacturing and assembling tolerances. Therefore, there has been a need to provide a new technique which can rectify such problems so as to improve the scanning operation in such a light beam scanning type imaging apparatus.

SUMMARY OF THE INVENTION

In accordance with the present invention, there is provided a synchronizing light beam detecting apparatus comprising: a cylindrical lens for receiving a light beam picked up at a predetermined point after passing through focusing means, and light-receiving means for receiving the light beam passing through the cylindrical lens. The cylindrical lens is disposed with the direction of its generatrix, i.e., the direction of no optical power, being in parallel with the scanning direction of the light beam. Assuming that the light beam scanning is carried out ideally, the plane defined by the scanning of the light beam under this condition in the vicinity of the cylindrical lens and the light-receiving means will be called a sweep plane of the light beam. In accordance with the teachings of the present invention, the direction of no optical power of the cylindrical lens is arranged to be in parallel with the sweep plane of the light beam.

Furthermore, the cylindrical lens and the light-receiving means are arranged in a particular manner in relation to the focusing means, which is normally used for focusing the light beam onto an imaging surface, such as a photosensitive member. That is, in a direction perpendicular to the sweep plane of the light beam, a point of deflection of the light beam (at deflecting means for deflecting the light beam over a predetermined angle repetitively) and a light-receiving surface of the light-receiving means are maintained in a conjugate relation through the focusing means and the cylindrical lens. In addition, in the sweep plane of the light beam, the light beam is focused on the light-receiving surface of the light-receiving means.

Preferably, the light-receiving means includes a photoelectric element, or a combination of light-guide means, such as an optical fiber, and a photoelectric element. The focusing means, preferably, includes a fθ lens which is also used for scanning the light beam along a predetermined scanning line as focused thereon. In the preferred embodiment, reflecting means is disposed at a predetermined point for picking up the light beam passing through the focusing means in a light beam scanning system and reflecting the light beam thus picked up toward the cylindrical lens. With the provision of such reflecting means, the cylindrical lens can be arranged at a desired position at will.

In accordance with a further aspect of the present invention, there is also provided a particular cylindrical lens and a cylindrical lens assembly particularly suitable for application to the present synchronizing light beam detecting apparatus. The proposed cylindrical lens is provided with an integrated mounting section and it is preferably comprised of a plastic material. Also proposed is a cylindrical lens assembly comprising a cylindrical lens, light-receiving means, and holding means for holding the lens and the light-receiving means spaced apart from each other by a predetermined distance, wherein the holding means includes a snap clamp section in which the cylindrical lens having a mating mounting section can be snapped in position.

It is therefore a primary object of the present invention to obviate the disadvantage of the prior art as described above and to provide an improved synchronizing light beam detecting apparatus.

Another object of the present invention is to provide an improved synchronizing light beam detecting apparatus high in performance and accuracy.

A further object of the present invention is to provide an improved synchronizing light beam detecting apparatus capable of compensating for the effects of an inclination of a mirror surface and/or a scatter in the point of deflection from one mirror surface to another of a polygonal mirror.

A still further object of the present invention is to provide an improved apparatus for detecting a synchronizing light beam which has a simple but sturdy structure and is easy to manufacture.

Other objects, advantages and novel features of the present invention will become apparent from the following detailed description of the invention when considered in conjunction with the accompanying drawings.

DESCRIPTION OF THE PREFERRED EMBODIMENTS

Figure 1:
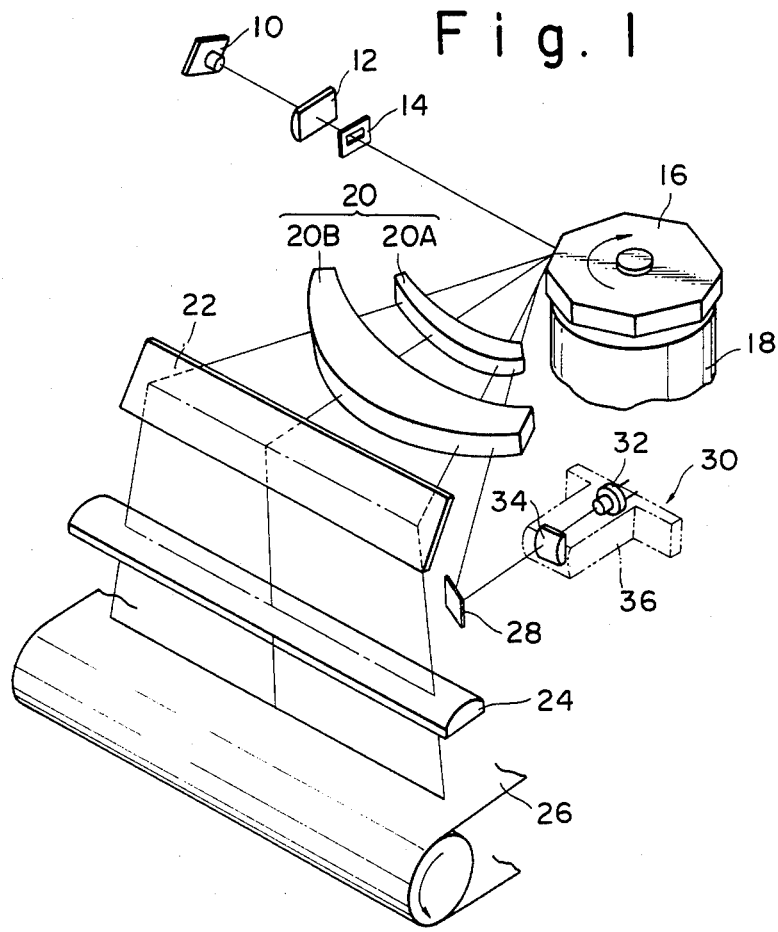
FIG. 1 is a schematic illustration showing in perspective view the overall structure of a laser printer to which a synchronizing light beam detector constructed in accordance with one embodiment of the present invention is advantageously applied.

Referring now to FIG. 1, there is schematically shown a laser printer including a synchronizing light beam detecting apparatus constructed in accordance with one embodiment of the present invention. As shown, the laser printer includes a semiconductor laser 10 as a light source, and a light beam emitted from the laser 10 is first collimated by a collimating lens (not shown) and then passed through a cylindrical lens 12 and an aperture plate 14. Then, the light beam impinges on a rotating polygonal mirror 16 which is driven to rotate by a motor 18 in the direction indicated by the arrow at constant speed. The polygonal mirror 16 is provided with a plurality of identical, flat mirror surfaces arranged circumferentially, and, thus, the light beam incident upon one of the mirror surfaces of the polygonal mirror 16 is reflected so that the reflected light beam now passes through a fθ lens 20, which serves as a focusing or image-forming lens and which includes a pair of positive meniscus lenses 20A and 20B in the illustrated example. Then, the light beam is reflected by a flat mirror 22 and the reflected light beam passes through a cylindrical lens 24 to impinge upon a photosensitive belt 26 as focused thereon in the form of a spot.

The photosensitive belt 26 in the form of an endless belt is extended between a pair of rollers, only one of which is shown in FIG. 1 and at least one of which is driven to rotate as indicated by the arrow, so that the belt 26 runs at a predetermined speed during operation. The direction of movement of the photosensitive belt is sometimes referred as the auxiliary scanning direction. As previously mentioned, the polygonal mirror 16 is fixedly mounted on a rotating shaft of the motor 18 which is driven to rotate in a predetermined direction at constant speed during operation, so that as the polygonal mirror 16 rotates as driven by the motor 18, the light beam incident upon one of the mirror surfaces is scanned over a predetermined angle determined by the length of the mirror surface in the tangential direction, as indicated in FIG. 1. As a result, the beam spot focused on the photosensitive belt 26 is scanned along a predetermined scanning line, which is often referred to as the main scanning line, and this scanning operation is carried out repetitively as the polygonal mirror 16 rotates continuously. Under the condition, the light beam emitted from the laser 10 is modulated by image information and the photosensitive belt 26 is uniformly charged before being scanned by the light beam carrying image information, so that an electrostatic latent image is formed on the photosensitive belt 26. As is obvious for one skilled in the art, the latent image thus formed is developed and transferred to a transfer medium, thereby providing a hard copy of image information. Thus, although not shown for the clarity of the drawing in FIG. 1, there are normally disposed various image processing units, such as charging, developing, and transferring units, along the belt 26. Besides, the outlet cylindrical lens 24 is provided for removing irregularities in pitch of the light scanning in the auxiliary scanning direction, or the direction of movement of the belt 26.

It is to be noted that the entire scanning angle of the light beam deflected by a particular mirror surface of the polygonal mirror 16 is larger than a predetermined scanning angle which is used for imaging and which corresponds to a predetermined imaginary scanning line across the photosensitive belt 26. And, thus, a pick-up, flat mirror 28 is disposed so as to receive the light beam deflected by an initial section of a particular mirror surface of the polygonal mirror and passing through the fθ lens 20 before the light beam enters into a image forming scanning region. The light beam thus picked up by the pick-up mirror 28 is used for synchronizing the image forming scanning operation so that it defines a synchronizing light beam. This synchronizing light beam is then directed toward a synchronizing light beam detecting apparatus 30 embodying the present invention.

Figure 2:
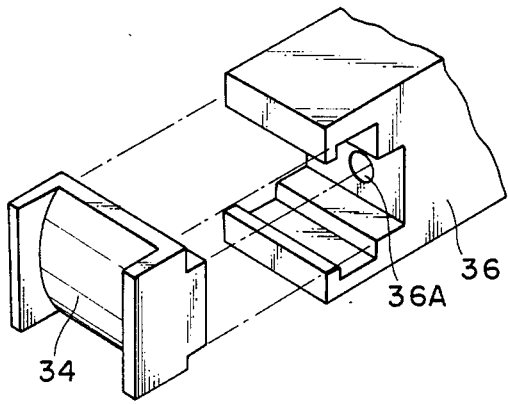
FIG. 2 is a schematic illustration showing in perspective view how the cylindrical lens 34 is fitted into the snap clamp section of the holder in the structure shown in FIG. 1.
Figure 3:
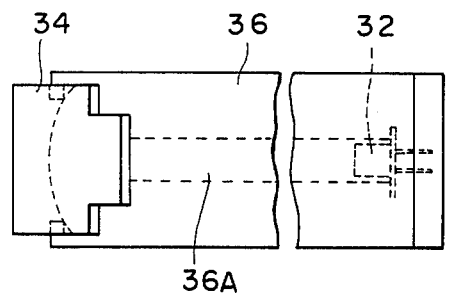
FIG. 3 is a schematic illustration showing the overall structure of the cylindrical lens assembly provided in the structure shown in FIG. 1.

The illustrated synchronizing light beam detecting apparatus includes a photoelectric element 32, a cylindrical lens 34, and a holder 36 for holding the element 32 and the lens 34 in position as spaced apart from each other. Although not shown for the sake of clarity, it should be understood that the synchronizing light beam detecting apparatus 30 is mounted on a housing or frame fixed in position. A preferred embodiment of the synchronizing light beam detecting apparatus is shown in FIGS. 2 and 3. As shown, the holder 36 is provided with a snap clamp section at its forward end and the cylindrical lens 34 provided with a mounting portion can be snapped into the snap clamp section of the holder 36 to be located and clamped in position. The holder 36 is generally in the form of an elongated block and it is provided with a through-hole 36A at its center. And, the photoelectric element 32 is fitted into the hole 36A at the rear end of the holder 36, so that the synchronizing light beam incident upon the cylindrical lens 34 passes through the through-hole 36A to impinge upon a light-receiving surface of the photoelectric element 32. In the illustrated embodiment, since the element 32 is substantially enclosed, it is well protected from adverse effects of stray light.

Figure 4A:
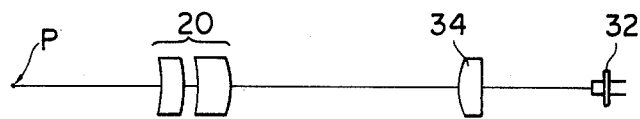
FIGS. 4a and 4b are schematic illustrations showing the particular arrangement of main elements of the synchronizing light beam detector provided in the structure shown in FIG. 1.

Now, the principle of the present invention will be described with particular reference to FIGS. 4a and 4b. FIG. 4a is a schematic illustration which shows how the deflecting point P on the polygonal mirror 16, fθ lens 20, cylindrical lens 34, and photoelectric element 32 are arranged when viewed in a direction in parallel with the sweep plane of the light beam. It is to be noted that the fθ lens 20 and the cylindrical lens 34 establish a conjugate relation between the deflecting point P on the polygonal mirror and a light-receiving surface of the photoelectric element 32 in a direction perpendicular to the sweep surface of the light beam, i.e., in the vertical direction in FIG. 4a. If the so-called mirror surface inclination is present, wherein a particular mirror surface of the polygonal mirror 16 is inclined with respect to its rotating axis, then the direction of light beam deflected by this mirror surface moves up and down in the direction vertical to the sweep surface with the deflecting point P as a center. In the case where the deflecting point P is not in conjugate relation with the light-receiving surface of the photoelectric element 32, such up and down movement of the deflected beam would cause the light beam to move across the light-receiving surface of the photoelectric element 32 in the direction perpendicular to the sweep plane, which would cause fluctuations in the output of the photoelectric element 32, thereby impairing proper synchronization. However, in accordance with the present invention, since a conjugate relation is established between the deflecting point P on the polygonal mirror 16 and the light-receiving surface of the photoelectric element 32, even if the direction of deflected light beam fluctuates due to an inclination of the mirror surface of the polygonal mirror 16, the point of light beam incident upon the light-receiving surface of the photoelectric element 32 is maintained unchanged in the direction perpendicular to the sweep plane. In this manner, synchronization is not adversely affected by the so-called mirror surface inclination of the polygonal mirror 16 in accordance with the teachings of the present invention.

Figure 4B:
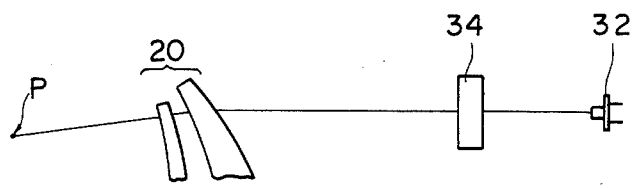

On the other hand, FIG. 4b schematically shows the arrangement of the deflecting point P, fθ lens 20, cylindrical lens 34, and photoelectric element 32 when viewed on the sweep plane. The light beam deflected at the deflecting point P on the polygonal mirror 16 passes through the fθ lens 20 serving as a focusing lens and then the cylindrical lens 34 to impinge upon the light-receiving surface of the photoelectric element 32. It is to be noted that, on the sweep plane, the light beam is focused on the light-receiving surface of the photoelectric element 32 only by the focusing action of the fθ lens 20 because the cylindrical lens 34 is disposed with the direction of its generatix being in parallel with the sweep plane and thus it does not provide a focusing action on the sweep plane. The criticality of providing such a structure in which the light beam deflected by the polygonal mirror 16 is focused onto the light-receiving surface of the photoelectric element 32 only by the fθ lens 20 on the sweep plane will be better understood if explained with reference to FIG. 5.

Figure 5:
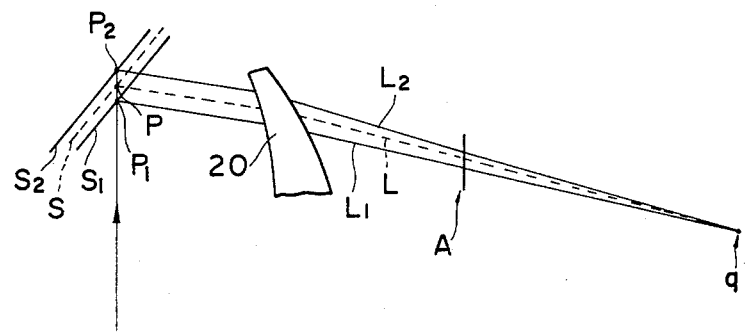
FIG. 5 is a schematic illustration which is useful for explaining the effect of the present invention.

As mentioned previously, because of tolerances in manufacture and possibly in assemblage, there may be a scatter in the distance between the rotating axis of the polygonal mirror and each of the mirror surfaces arranged circumferentially. Thus, as shown in FIG. 5, if a position indicated by the dotted line S is a designed position for each of the mirror surfaces of the polygonal mirror 16, the actual position of each of the mirror surfaces would fluctuate as indicated by positions $S_1$ and $S_2$, for example. With such fluctuations in position of the mirror surface, the deflecting position of the light beam on the polygonal mirror 16 also fluctuates to $P_1$ and $P_2$ around a designed deflecting position P. With such fluctuations in the deflecting point, the optical path for the deflected light beam also fluctuates, for example, to $L_1$ and $L_2$, from a designed path L. Under these conditions, if the light-receiving surface of the photoelectric element 32 were located, for example, at a position indicated by A, there would be produced a temporal difference between the optical paths $L_1$ and $L_2$, and such a temporal difference would cause an error in the timing of initiation of each light scanning operation.

It should, however, be noted that even if there may be a scatter in the deflecting point P on the polygonal mirror 16, the imaging-forming or focusing point q of the light beam defined by the fθ lens 20, which is shown as a single lens for the sake of brevity in FIG. 5, remains unchanged. Thus, in accordance with the teachings of the present invention, since it is so structured that the light-receiving surface of the photoelectric element 32 on the sweep plane is located at the focusing point q of the synchronizing light beam by the focusing lens, or fθ lens 20 in the illustrated embodiment, any error arising from fluctuations of the deflecting point P would not adversely affect the synchronizing function.

Figure 6:
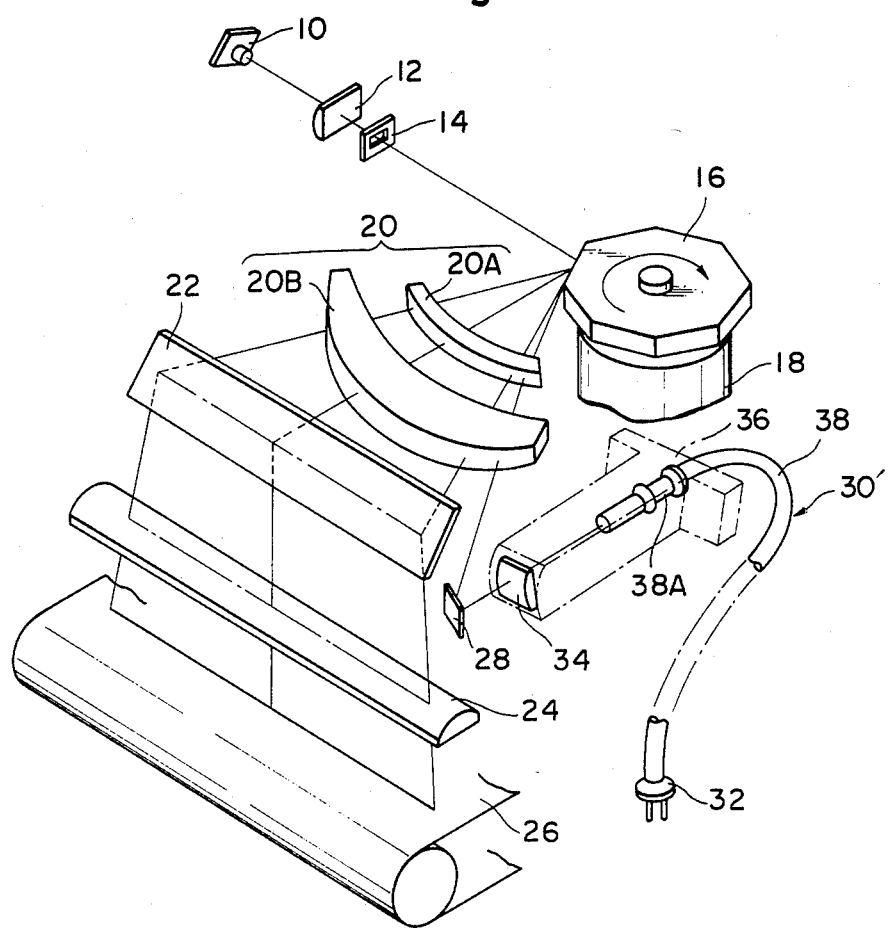
FIG. 6 is a schematic illustration showing in perspective view the overall structure of a laser printer to which a synchronizing light beam detector constructed in accordance with another embodiment of the present invention is advantageously applied.

Now, another embodiment of the present invention will be described in detail with reference to FIGS. 6 through 8. It is to be noted that this embodiment is similar to the one described above so that like elements are indicated by like numerals. The structure shown in FIG. 6 is identical to that shown in FIG. 1 excepting the fact that use is made of an optical fiber 38 in FIG. 6. That is, in accordance with this aspect of the present invention, since use is made of the optical fiber 38, the photoelectric element 32 can be disposed at a desired position, e.g., in the vicinity of a signal processing unit to which an electrical signal produced by the photoelectric element 32 is supplied. Such a structure is practically advantageous because a metal interconnection between the photoelectric element 32 and the signal processing unit can be minimized, thereby minimizing the noise pick-up due, for example, to electromagnetic effects and eliminating the necessity to provide a buffer circuit.

Described in more detail, a synchronizing light beam detecting apparatus 30' includes the cylindrical lens 34, the photoelectric element 32, and the holder 36, as the previous embodiment. However, in the present embodiment, the holder 36 does not hold the photoelectric element 32, unlike the case in the previous embodiment. The detecting apparatus 30' includes the optical fiber 38 whose forward end is held in position by the holder 36 and its rear end is operatively connected to the photoelectric element 32, which is preferably located closer to a signal processing unit (not shown) to which the photoelectric element 32 supplies an electrical signal. The optical fiber 38 may be of any desired length and it can have a diameter, for example, of 1 mm, but an optical fiber of any diameter or a bundle of optical fibers may also be used, if desired.

Figure 7:
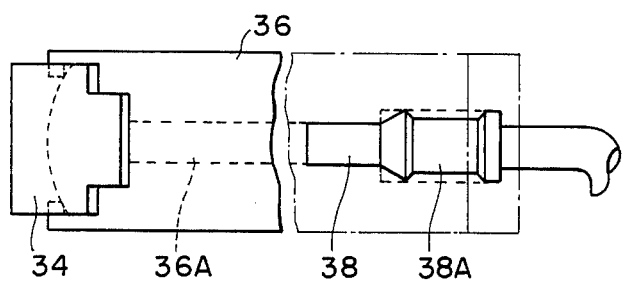
FIG. 7 is a schematic illustration showing the overall structure of the cylindrical lens assembly provided in the structure shown in FIG. 6.
Figure 8:
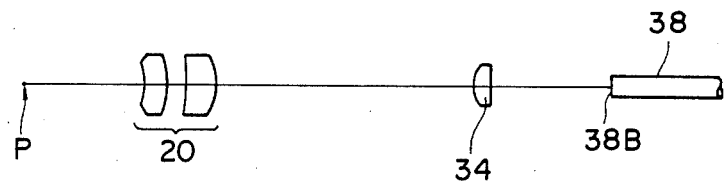
FIG. 8 is a schematic illustration showing the particular arrangement of the main elements of the synchronizing light beam detector provided in the structure shown in FIG. 6.

As best shown in FIG. 7, the front end portion of the optical fiber 38 is fixedly provided with a stopper 38A which is fitted in an enlarged recess formed in the holder 36 so that the front end portion of the optical fiber 38 is fixedly held in position in the holder 36 with its light-receiving surface 38B located in position opposed to the cylindrical lens 34. Similarly with the previous embodiment, the holder 36 is formed with a snap clamp section at its forward end and the cylindrical lens 34 provided with a mounting section is snap clamped in position. FIG. 8 shows how the light-receiving surface 38B of the optical fiber 38 is located with respect to the other elements. In the illustrated embodiment, the light beam deflecting point P and the light-receiving surface 38B of the optical fiber 38 are positioned to maintain a conjugate relation through the $f\theta$ lens 20 and the cylindrical lens 34 in a plane parallel with the sweep plane. With this structure, even if there is an inclination in a mirror surface of the polygonal mirror 16, the synchronizing light beam impinges on the same position on the light-receiving surface 38B of the optical fiber 38 when viewed in the direction in FIG. 8.

Incidentally, since the size of the light beam in the direction perpendicular to the sweep plane at a synchronizing light beam detecting position, defined by the location of the light-receiving surface 38B, varies depending on the focal distance of the cylindrical lens 34, the focal distance of the cylindrical lens 34 is preferably selected to obtain an appropriate beam size such that a sufficient amount of light is coupled to the optical fiber 38 and losses due, for example, to imperfections at the light incident end surface do not provide a significant error to the synchronizing operation. In addition, it is preferable to set the size of the light beam in the direction perpendicular to the sweep plane at the synchronizing light beam detecting position or the light-receiving surface 38B by selecting an appropriate focal distance of the cylindrical lens 34 with due consideration of the core diameter of the optical fiber 38 and the surface property, such as presence of imperfections, at the light-inputting end surface of the optical fiber 38, thereby enhancing the detection of a synchronizing light beam.

Figure 9:
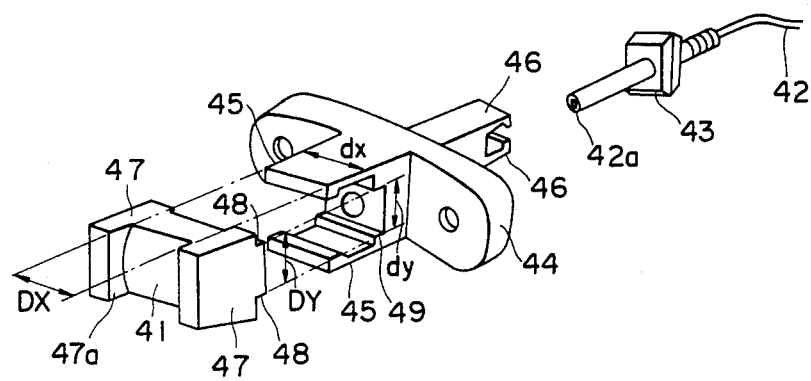
FIG. 9 is an exploded, schematic illustration showing in perspective view the overall structure of a synchronizing light beam detector constructed in accordance with a further embodiment of the present invention which is particularly suited for use in a light scanning apparatus, such as a laser printer.
Figure 10:
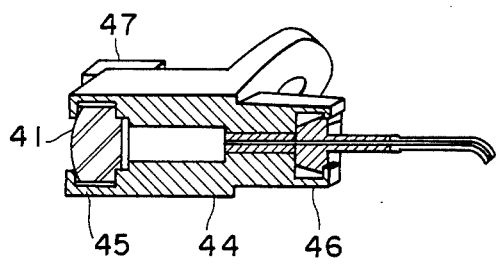
FIGS. 10 and 11 are schematic illustrations showing various portions of the structure shown in FIG. 9.
Figure 11:
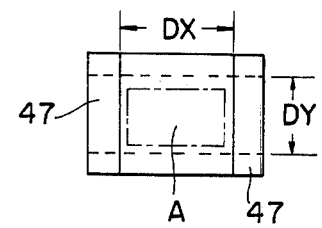

Referring now to FIGS. 9 through 11, a further embodiment of the present invention will be described. As shown, the synchronizing light beam detecting apparatus includes a cylindrical lens 41 and an optical fiber 42 leading to a photoelectric element (not shown). The optical fiber 42 has its light-inputting end surface 42a located in alignment with the optical axis of the cylindrical lens 41. For this purpose, the apparatus also includes a holder 44 structured to hold the cylindrical lens 41 and the forward end portion of the optical fiber 42 in position. The holder 44 is comprised of a plastic material having an appropriate degree of elasticity. The holder 44 is provided with a pair of front upper and lower clamp arms 45, 45 which extend in the forward direction as spaced apart from each other by a predetermined distance, thereby defining a front snap clamp section. As shown in FIG. 9, each of the front upper and lower clamp arms 45, 45 is provided with a recessed section at its inner surface so that there is formed an inwardly projecting ridge portion. Similarly, the holder 44 is also provided with a pair of rear upper and lower clamp arms 46, 46 spaced apart from each other by a predetermined distance, and each of these clamp arms 46, 46 is also formed with a recess at its inner surface to provide an inwardly projecting ridge so that a rear snap clamp section is provided by these two arms 46, 46.

The cylindrical lens 41 is integrally formed with a pair of mounting sections 47, 47 on both sides and outside of an effective lens region A as shown in FIG. 11. The mounting sections 47, 47 extend generally in parallel with the optical axis of the cylindrical lens 41, thereby providing inner mounting surfaces 47a, 47a extending perpendicular to the generatix of the cylindrical lens 41. It is to be noted that these inner mounting surfaces 47a, 47a are located just outside of the effective lens region A. The distance Dx between the opposed inner mounting surfaces 47a, 47a corresponds to the width of the front clamp arm dx. The rear surface of the cylindrical lens 41 is formed with top and bottom steps 48, 48, just outside of the effective lens region A, thereby defining a projection which has the height of DY and which is rectangular in cross section. Correspondingly, the holder 44 is formed with a vertical recess 49 having the height of dy, which corresponds to DY, so that the projection defined by the steps 48, 48 at the rear side of the cylindrical lens may be snugly fitted into the vertical recess 49 when the cylindrical lens 41 is snapped into a clamped position. When so located, the inwardly extending ridges of the arms 45, 45 are fitted between the inner mounting surfaces 47a, 47a. As a result, the cylindrical lens 41 is properly positioned three dimensionally, i.e., in the direction of the generatix, in the direction of the optical axis, and in the direction perpendicular both to the directions of the generatix and the optical axis. Similarly, the optical fiber 42 is fixedly provided with a stopper member 43 at its front end portion, and the stopper member 43 can be snap clamped between the rear clamp arms 46, 46. When the optical fiber 42 is so clamped, its front end portion is fitted into a guide hole provided in the holder 44 so that the light-inputting end surface 42a is properly located in alignment with and opposed to the rear surface of the cylindrical lens 41.

Figures 12, 13, 14:
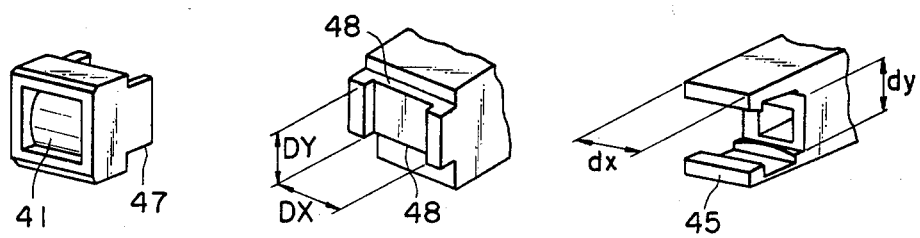
FIGS. 12 through 14 are schematic illustrations showing a still further embodiment of the present invention.

FIGS. 12 through 14 show another embodiment which is similar to the previously described embodiment in many respects excepting that the mounting section 47 of this embodiment is provided all around the cylindrical lens 41 in the form of a picture frame. The mounting section 47 of this embodiment is provided with a pair of side projections which extend in the rearward direction as illustrated in FIG. 13, and the distance DX between the inner mounting surfaces of the pair of side projections is determined corresponding to the width dx of the front clamp arms 45, which is equal to the width of the vertical recess 49. Thus, when the cylindrical lens 41 of this embodiment is snapped into position, the inwardly extending ridges of the upper and lower clamp arms 45, 45 engage with the front surface of the cylindrical lens 41 outside of the effective lens region A and the pair of side projections of the holding section 47 engages with the opposite side surfaces of the body of the holder 44 thereby restraining the movement of the cylindrical lens 41 in the direction of the generatix. In addition, the rear projection defined by the top and bottom steps 48, 48 of the cylindrical lens 41 is fitted into the vertical recess 49.

Figure 15:
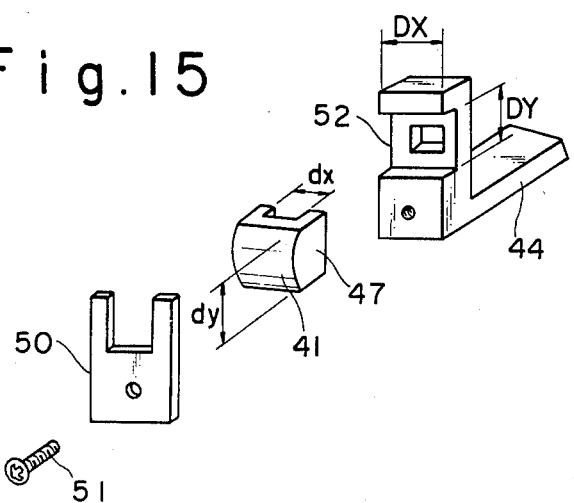
FIGS. 15 and 16 are exploded, schematic illustrations in perspective view showing other embodiments of the present invention.

FIG. 15 shows a further embodiment of the present invention, in which case the holder 44 is comprised of a rigid material, such as aluminum die-cast. The cylindrical lens 41 provided with the mounting section 47 is fitted into a recess 52 formed in the holder 44, and then a leaf spring with its central top portion removed in a rectangular shape larger in size than the effective lens region A of the cylindrical lens 41 is fixedly attached to the holder 44 by means of a screw 51, thereby keeping the cylindrical lens 41 pressed against the holder 44. In this case, the holding section 47 is provided with a pair of rearwardly extending projections spaced apart from each other by the distance dx corresponding to the width DX of the holder 44, and, thus, the inner opposed surfaces of these projections come into engagement with the opposite side surfaces of the holder 44 so that the lateral movement of the cylindrical lens 41 in the direction of the generatrix is suitably restrained. Furthermore, the cylindrical lens 41 has the height dy which corresponds to the height DY of the recess 52 so that its vertical movement is also suitably restrained when assembled.

Figure 16:
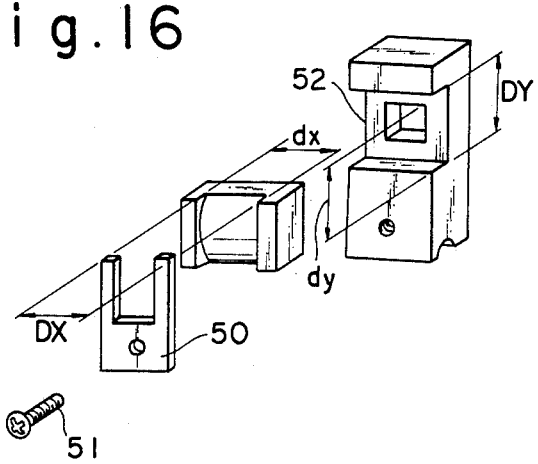

FIG. 16 shows a still further embodiment of the present invention, which is similar to the previous embodiment just described above in many respects excepting that the mounting section 47 of the cylindrical lens 41 is formed by a pair of forwardly extending projections. In this case, the outermost distance DX between the pair of legs defined at the top portion of the leaf spring 50 corresponds to the distance dx between the opposed inner mounting surfaces of the forwardly extending projections. Thus, when assembled, any lateral movement of the cylindrical lens 41 is restained through the engagement between the leaf spring 50 and the holding section 47 of the cylindrical lens 41.

As described above, in accordance with this aspect of the present invention, the cylindrical lens 41 is integrally provided with the mounting section 47 which may be grabbed by fingers when snap fitted into the clamp section of the holder 44 and which is used advantageously in restraining undersired movement. It is to be also noted that the cylindrical lens 41 and its mounting section 47 are preferably comprised of a plastic material as a single element.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. Light scanning apparatus, comprising:
a light source for emitting a light beam;
deflecting means for deflecting said light beam emitted from said light source over a predetermined angle;
focusing means for focusing said deflected light beam to thereby cause said deflected light beam to scan along an imaginary line;
a cylindrical lens for receiving said light beam passing through said focusing means sampled at a predetermined position; and
light-receiving means having a light-receiving surface for receiving said light beam passing through said cylindrical lens;
wherein said cylindrical lens is arranged with its direction of generatrix in parallel with said scanning line, and said light-receiving surface is so arranged that a conjugate relation is established between a deflecting point of said light beam at said deflecting means and said light-receiving surface through said focusing means and said cylindrical lens in a plane perpendicular to the generatrix direction of said cylindrical lens.

2. The apparatus of claim 1 wherein said light-receiving surface is so located that said light image is focused thereon by said focusing means in a plane defined by a scanning motion of said light beam.

3. The apparatus of claim 2 further comprising reflecting means disposed at said predetermined position for reflecting said light beam passing through said focusing means toward said cylindrical lens, and wherein said deflecting means includes a polygonal mirror driven to rotate in a predetermined direction at constant speed.

4. The apparatus of claim 3 wherein said focusing means includes a $f\theta$ lens.

5. The apparatus of claim 3 wherein said light-receiving means includes a photoelectric element having an input end surface which defines said light-receiving surface.

6. The apparatus of claim 3 wherein said light-receiving means includes light-guiding means having an input end which defines said light-receiving surface and an output end, and a photoelectric element which is optically coupled to said output end of said light-guiding means.

7. The apparatus of claim 6 wherein said light-guiding means includes an optical fiber.

8. The apparatus of claim 1 further comprising holding means for holding said cylindrical lens and said light-receiving means spaced apart from each other by a predetermined distance.

9. The apparatus of claim 1 wherein said holding means includes a first snap-clamp section in which said cylindrical lens may be snap-clamped in position.

10. The apparatus of claim 9 wherein said holding means further includes a second clamp section in which said light-receiving means may be snap-clamped in position at least partly.

11. The apparatus of claim 9 wherein said cylindrical lens is integrally provided with a mounting section outside of its effective lens region, said mounting section being provided with lateral engaging means engageable with said holding means when set in position to restrain a lateral movement thereof with respect to said holding means.

12. The apparatus of claim 11 wherein said first snap-clamp section is provided with a pair of top and bottom arms extending forwardly as spaced apart from each other by a predetermined distance, each of said arms being provided with an inner recess at its inner surface to thereby define an inwardly projecting ridge at its free end.

13. The apparatus of claim 12 wherein said lateral engaging means includes a pair of side projections which extend in parallel with the optical axis of said cylindrical lens and which are spaced apart from each other by a predetermined distance, wherein said holding means is partly fitted between said pair of side projections such that said cylindrical lens is prevented from moving laterally with respect to said holding means.

14. The apparatus of claim 13 wherein said holding means includes a block provided with a through hole which provides an optical path between said cylindrical lens and said light-receiving means.

15. A system comprising:
   a light source emitting a light beam;
   a photosensitive member;
   means for selectively deflecting said light beam to scan it repetitively over a selected angle;
   means for focusing the deflected light beam and means for directing the focused beam to cause it to impinge on the photosensitive member at a point which scans the member along a selected scan line;
   a cylindrical lens receiving the focused light beam over a sampling portion of said selected angle; and
   light-receiving means having a light-receiving surface for receiving the light beam passing through said cylindrical lens;
   wherein said cylindrical lens is arranged with its generatrix in parallel with said scanning line, and said light-receiving surface is arranged such that a conjugate relation is established between a deflecting point of said light beam at said deflecting means and said light-receiving surface through said focusing means and said cylindrical lens in a plane perpendicular to the generatrix of said cylindrical lens.

16. A system as in claim 1 in which the light receiving means includes means for detecting a selected characteristic of the light beam received thereby, and for generating in response a synchronizing control signal.

* * * * *